US005434399A

United States Patent [19]

Barbe

[11] Patent Number: 5,434,399

[45] Date of Patent: Jul. 18, 1995

[54] DEVICE FOR CONTROLLING SELECTIVE ACCESS TO AT LEAST TWO COMPARTMENTS INSIDE AN ENCLOSURE

[75] Inventor: Serge Barbe, Besancon, France

[73] Assignee: Schlumberger Industries, Montrouge, France

[21] Appl. No.: 251,582

[22] Filed: May 31, 1994

[30] Foreign Application Priority Data

Jun. 2, 1993 [FR] France ........ 93 06589

[51] Int. Cl.[6] ........ G06K 5/00

[52] U.S. Cl. ........ 235/382

[58] Field of Search ........ 235/382, 22, 380; 340/825.34, 825.32; 380/23, 24, 28; 194/350

[56] References Cited

U.S. PATENT DOCUMENTS 4,234,932 11/1980 Gorgens ........ 235/382 X
4,595,985 6/1986 Sakakiya ........ 235/22 X
4,801,787 1/1989 Suzuki ........ 235/382 X
4,870,400 9/1989 Downs et al. ........ 235/382
5,226,080 7/1993 Cole et al. ........ 235/382 X

FOREIGN PATENT DOCUMENTS 3433774 3/1986 Germany ........ 235/382
8503787 8/1985 WIPO ........ 235/382

*Primary Examiner*—Donald Hajec
*Assistant Examiner*—Thien Minh Le
*Attorney, Agent, or Firm*—Frishauf, Holtz, Goodman & Woodward

[57] ABSTRACT

Apparatus for controlling access to at least first and second compartments defined inside an enclosure of a dispenser for goods and/or services, in such a manner as to prevent access to the second compartment while allowing access to the first compartment. An identifying object of the access-seeking person is recognized, the object being inserted from outside the dispenser. The resulting signal is communicated in an encrypted manner with a central unit which, in turn, communicates in an encrypted manner with an actuator, so as to control the actuator. The actuator is disposed inside the second compartment and is adapted to allow opening/-closing of a lock associated with the second compartment. The central unit generates an encrypted message with the aid of an own key specific to the central unit. The actuator is also adapted to decrypt the message in order to recover such own key, the latter thus becoming the derived key adapted to be used to generate at least one communication message between the actuator and the central unit, and vice versa.

6 Claims, 3 Drawing Sheets

DEVICE FOR CONTROLLING SELECTIVE ACCESS TO AT LEAST TWO COMPARTMENTS INSIDE AN ENCLOSURE

FIELD OF THE INVENTION

The present invention is directed to apparatus for controlling access to at least first and second compartments defined inside an enclosure, in accordance with a given hierarchy. The invention is more particularly applicable to a dispenser of goods and/or services, such as foodstuffs or travel tickets, or a parking meter.

BACKGROUND OF THE INVENTION

It is known that such dispensers generally include an enclosure in which the apparatus for enabling operation of the dispenser is disposed. The enclosure is generally divided so as to define at least two compartments. The first compartment contains the operating means of the dispenser, such as the means for feeding through the money, the means for issuing a ticket corresponding to the requested service, the means for printing the ticket or any other apparatus necessary to the functioning of the dispenser. The second compartment is for keeping the valuables, in particular the cash, inserted by the user. The second compartment forms what is commonly called the cash box. The latter may for example contain a "coin cash box" and a "ticket cash box".

Each compartment has its own access door.

Access to the first compartment containing the various apparatuses and operating systems of the dispenser is not controlled in the same way as access to the cash box.

Persons having to enter the dispenser for maintenance or servicing do not normally have to enter the cash box, to which access is reserved solely to persons authorized to collect the money resulting from the transactions carried out.

Known dispensers have locks for barring access to the first compartment and, likewise, to the second compartment (cash box compartment). Thus, each person who needs to enter the dispenser is a holder of a key. The persons charged with maintenance and servicing have a key enabling access to the first compartment while the persons authorized to remove the sums contained in the cash box hold two keys, one for the first compartment and the other for the cash box.

This key system leads to some difficulties. For example, the keys are at risk of being duplicated relatively easily and it is, therefore, possible to pass the keys around or to give them to persons other than those authorized. Also, the persons who have access to the apparatus may be tempted to carry out fraudulent operations inside the dispensers. Moreover, the constraint of simplifying management leads to providing identical keys for a large number of dispensers. However, in doing this the risk of attempts at fraud is increased.

From the point of view of managing a number of dispensers of this type, it is important for the manager to know with as much certainty as possible the nature of the operations carried out and their frequency, and also the identity of the persons entering the apparatus on each occasion, and this is particularly important in relation to the persons charged with removal of the sums contained in the cash box.

It is desirable to determine for each person who seeks to gain entry to a dispenser the identity of that person in order to check if he/she is an authorized person. It is clear that a conventional system of locks and keys does not make it possible to make this check, since keys can be duplicated and the holder of a key is not necessarily an authorized person.

Devices have been proposed which attempt to control and regulate access to the cash box and especially to know its contents. Thus, devices exist, especially in the field of parking meters, comprising a collection center associated with a memory card and also associated with portable data processing means adapted to enter into communication on the one hand with the collection center and on the other hand with each parking meter, in encrypted language, with a view to knowing in particular the amounts of the sums contained in the interrogated parking meters. That device provides a check on access to the cash box. However, access to the cash box is always effected by means of a conventional key, with the resultant limitations mentioned above. Although that device is satisfactory, it can be improved.

SUMMARY OF THE INVENTION

It is one object of the invention is to provide a device which allows controlled, selective access to at least two compartments defined inside an enclosure. Another object of the invention is to do so in such a way as to identify the person attempting to enter the apparatus, and to check if that person is authorized in this respect. The device of the invention also has the object of ensuring the security of the device allowing the cash box to be opened, in an encrypted manner, without it being possible for a non-authorized person to effect opening of the cash box by a fraudulent action inside the first (maintenance) compartment.

To this end, according to the invention, an apparatus is provided for controlling selective access to at least a first compartment and a second compartment defined inside an enclosure of a dispenser for goods and/or services, in such a manner as to prevent access to the second compartment while allowing access to the first compartment. A recognition means recognizes an identifying object of the person seeking access, such object being inserted from the outside. The recognition means is adapted to communicate in an encrypted manner through first communication means with a central unit adapted in turn to communicate in an encrypted manner through second communication means with an actuator, so as to control the actuator which is disposed inside the second compartment and is adapted to allow opening/closing of a lock associated with the second compartment. The central unit includes means adapted to generate an encrypted message with the aid of an own key specific to the central unit (master key), the actuator having means adapted to decrypt the message in order to recover the own key, the latter thus becoming the derived key adapted to be used to generate at least one communication message between the actuator and the central unit and vice versa.

The own key is advantageously formed by a random number generated by the central unit.

In a preferred embodiment, the object which is inserted by the access-seeking person is a memory card, and the recognition means include a memory card reader (MCR).

The communication means preferably include an algorithm of the DES type (data encryption standard).

The recognition means are also adapted to check a code assigned to the user, or holder, of the memory card, in order to check the identity of the user in addition to the key (MC).

The apparatus also comprises a memory adapted to record the set of operations carried out and the identity of the access-seeking persons.

BRIEF DESCRIPTION OF THE DRAWINGS

The invention will be better understood in the light of the following description, relating to an illustrative, non-limiting example, with reference to the accompanying drawings, in which.

DETAILED DESCRIPTION OF THE INVENTION

Figure 1:
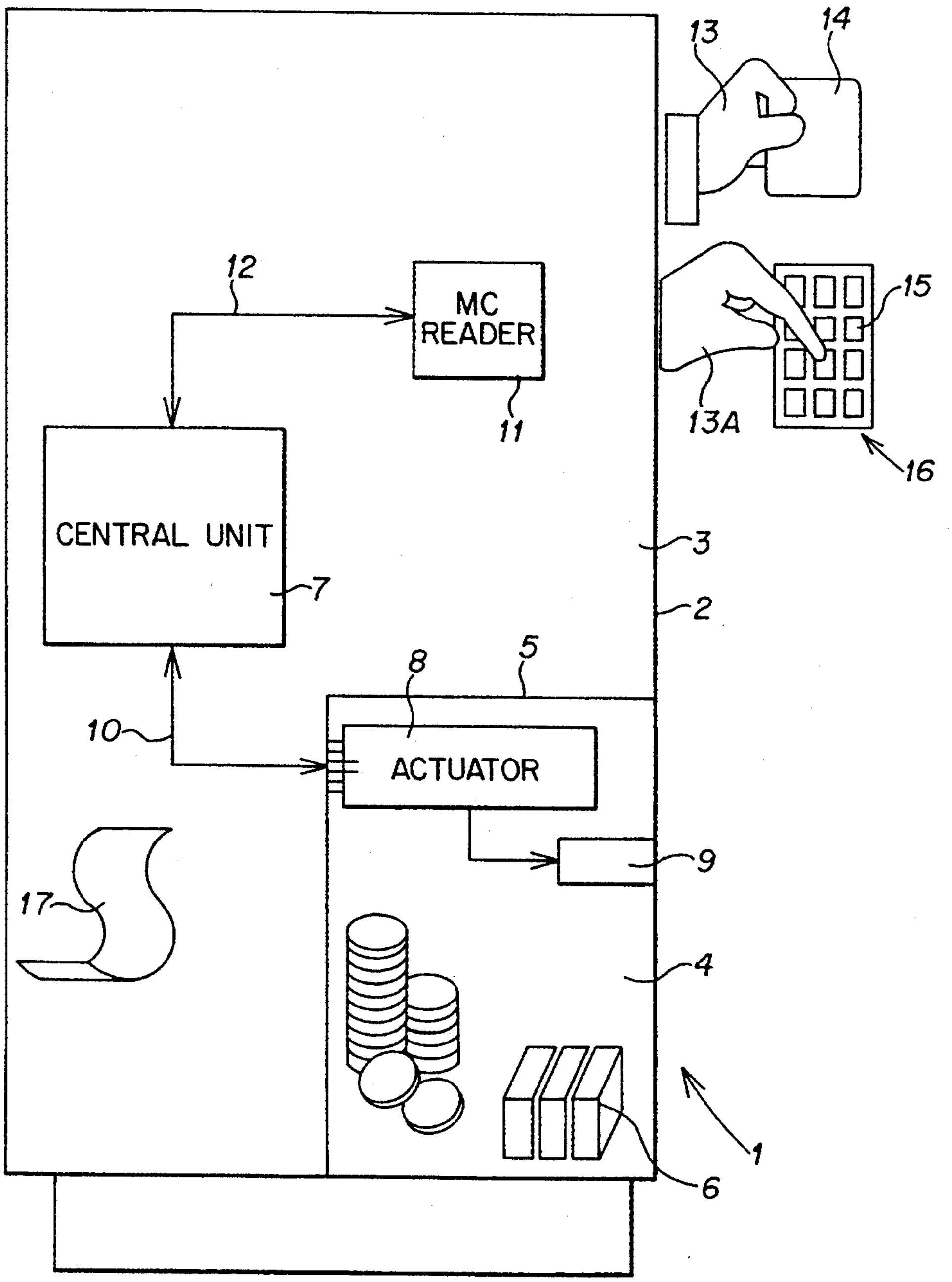
FIG. 1 shows a dispenser schematically in a longitudinal section in accordance with the invention.

As shown in FIG. 1, the dispenser 1 of goods or services, such as a travel ticket dispenser for example, is formed by a generally rectangular casing 2 defining an interior enclosure which is itself divided into a first compartment 3 and a second compartment 4. The second compartment 4 is separated from the first compartment 3 by walls 5. The second compartment 4 is of an armored type and is for holding the sums paid in exchange for the service obtained by the users of such a dispenser. The second compartment is commonly called the cash box compartment. The cash stored inside the cash box is represented symbolically by the general reference numeral 6. The dispenser has a central unit 7 inside the first compartment 3 that is adapted to command and control the assembly of devices and systems needed and suitable for the operation of the ticket dispenser. For example, the central unit 7 is a suitably programmed microprocessor which commands and monitors the course of operation of the coin selector and the passage of the money either to the cash box or to the change return. The central unit 7 also allows the door opening and closing systems inside the device to be controlled. In addition, the central unit 7 is associated with management software systems and comprises memories for storing information pertaining to the operations effected inside the dispenser.

The cash box 4 is disposed inside the dispenser and is accessible through a door exclusive thereto (not shown). The dispenser 7 has a door allowing access to the first compartment 3 (not shown), it being understood that access to the cash box is not possible directly from the outside since the latter is provided with its own door operated by a lock disposed inside.

The cash box 4 includes an actuator 8 adapted to operate a lock 9 for opening the door of the cash box 4. The actuator 8 is connected to the central unit 7 by connections symbolically represented by the line 10.

Inside the dispenser 1 is a memory card reader 11 (MCR), connected to the central unit 7 by a connection 12.

Also shown in symbolic manner in FIG. 1 are the hand 13 of a user carrying a memory card 14, and the hand 13A of the same user in the process of striking the keys 15 of a keypad 16 disposed on one of the outside walls of dispenser 1.

A ticket 17 represents the counterpart, in the form of a service, for the money inserted by the user/customer.

One of the objects of the device in accordance with the invention is to allow access to the inside of dispenser 1 only to those persons authorized to have such access, and to do so moreover in a specific hierarchy depending on the authorization level of each person, some people being authorized to enter the first compartment 3, to carry out maintenance and/or repair operations, while other, different people are authorized to have access to the inside of cash box 4.

Figure 2:
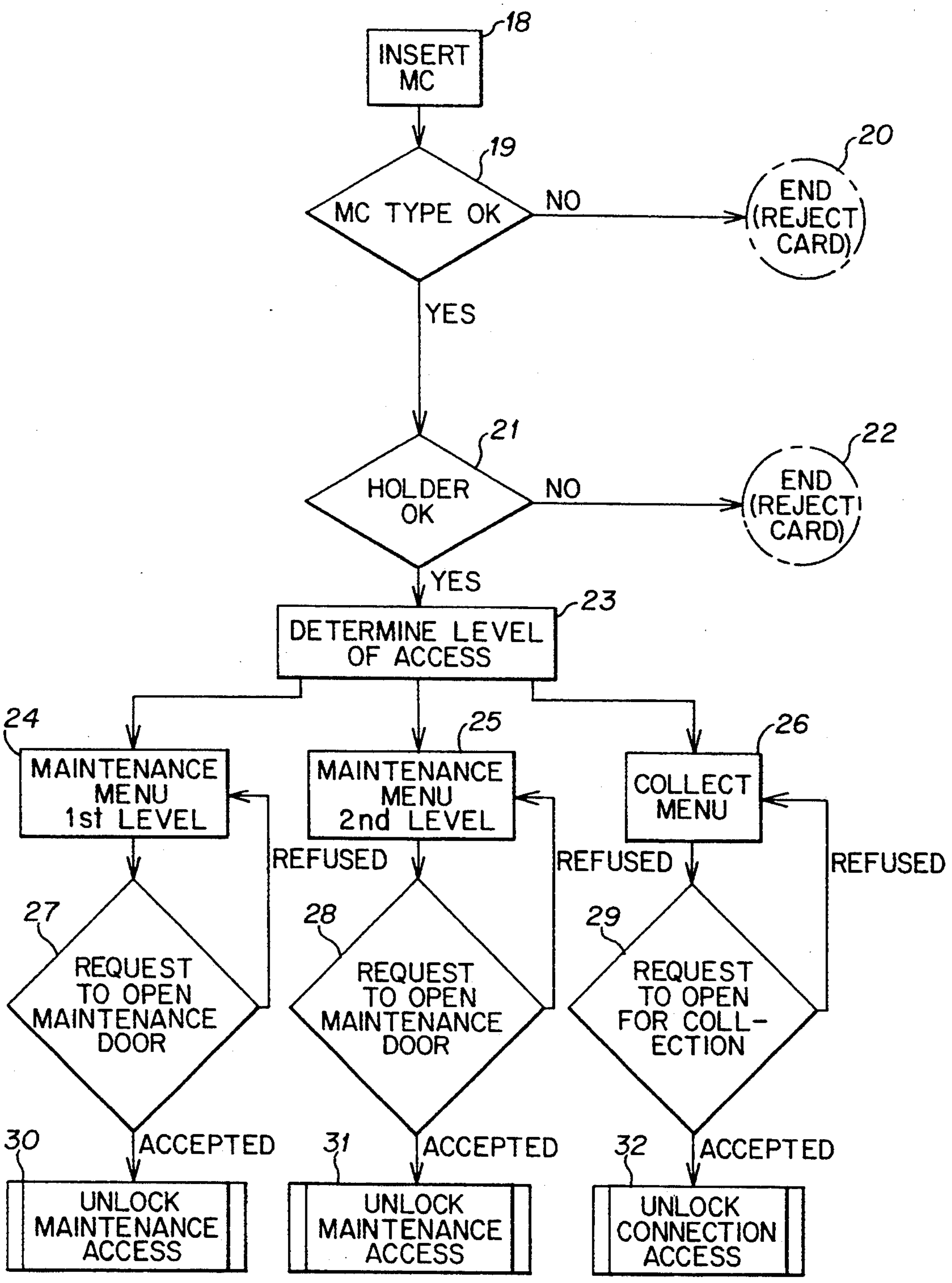
FIG. 2 is a flow chart of the operation of the device of the invention.

Referring to FIGS. 1 and 2, the person seeking access (for maintenance purposes or for entering the cash box) is represented symbolically by the hand 13 and carries a memory card (MC) 14 of known type, comprising memory means and electronic means adapted to enable communication with the MCR 11. The card 14 is inserted by the user in a slot provided for this purpose (not shown) and associated with MCR 11. This corresponds to the functional block 18 of FIG. 2.

The first operation effected by MCR 11 is to verify that the inserted MC conforms to the expected type of MC appropriate for use to enter the dispenser 1 (see functional block 19). This verification gives a response that is either negative or positive. If the MC is not confirmed (response no), MCR 11 informs the user by returning the inserted card (functional block 20). This is a first security step to the extent that it avoids the insertion of false cards or cards which have been tampered with or that do not conform to the usage to which they are intended, such as for maintenance of this type of dispenser, for example.

Assuming that MC 14 has been recognized as conforming, the operation proceeds to a second verification stage, namely identification of the holder. Thus, it is not enough that the inserted MC 14 conforms, but it is also necessary that the person who has inserted the MC is among those who are authorized to enter the dispenser 1. In order to identify the card holder (block 21), the latter enters an individual identification code via the keypad 16 disposed on an outer surface of dispenser 1, by striking the corresponding keys 15 on the keypad 16, as indicated schematically in FIG. 1.

Again, depending on the result of this verification, the procedure results in either rejection and, thus, return of MC 14 to the user (block 22) or to validation in that the card holder is identified as being a proper holder. The operation then proceeds to a third step (block 23) for determining what type of operations are to be effected, in other words to determine the identity of the person and in particular the type of access which is sought, and that it is authorized, (maintenance and/or repair, or removal of sums from the cash box).

The preceding points relating to the operation of the device and given with reference to FIG. 2 are effected by a communication between the MCR 11 and the central unit 7, through the connection 12 (FIG. 1). The verifications of the conformity of the card and of the conformity of the holder and the determination of the nature of the access to be effected are carried out by the central unit 7.

As to the determination of the nature of the required entry by the user, the functional block 23 offers three possibilities in the example shown, namely maintenance referred to as first level, maintenance referred to as second level, and collection, i.e., access to the cash box to remove the money which it contains. These three possibilities are shown by way of example by the functional blocks of FIG. 2 referenced as 24, 25 and 26.

Access to the different possibilities is effected by the person seeking access, depending on the initially entered code or depending on the inserted card which itself carries information pertaining to the operation which the user can effect, thus selecting the corresponding functional block (24, 25 or 26). Assuming that the access-seeking user wishes to carry out a maintenance operation referred to as first level (i.e. on only some of the apparatus in the dispenser 1 and/or to inspect certain data files, or for repair), it is required to ensure once again that this is possible, having regard to the nature of the inserted MC 14, the user and/or other information, such as the timeliness of a maintenance and/or repair intervention, depending for example on the date of the last entry or on any other factor, e.g. a breakdown.

If the determination made in block 23 leads to the first level of maintenance per block 24, then the last stage of verification is carried out per block 27 in verifying whether the requested operation is possible. If the determination is in the affirmative, then central unit 7 unlocks the door of the dispenser 1 per block 30 and, thus, provides access to the interior thereof (apart from cash box 4). If access is refused per block 27, the device causes the operation to return to the first level maintenance block 24.

Thus, for each type of desired operation, a verification is effected, leading to refusal or acceptance, which results in the corresponding door being opened or kept locked (in the case of refusal). The blocks 27, 28 and 29 correspond, respectively, to these last stages of verification for different operations.

In the case of requested operations being accepted, the blocks 30, 31 and 32 are reached, symbolizing the unlocking of the corresponding door, namely unlocking the main door in the case of blocks 30 and 31 with a view to maintenance and/or repair operations, and unlocking the door of cash box 4 in the case of the block 32.

The operations of verifying the card holders and of identifying the card and the requested operations make it possible to ensure, by storing this information in the central unit 7 while said operations are taking place, that an access-seeking person is an authorized person, and also that a person attempting to collect really is an authorized person. It is also ensured that the person entering dispenser 1 does not intervene to effect maintenance and/or repair operations which exceed his duties and/or his competence.

Figure 3:
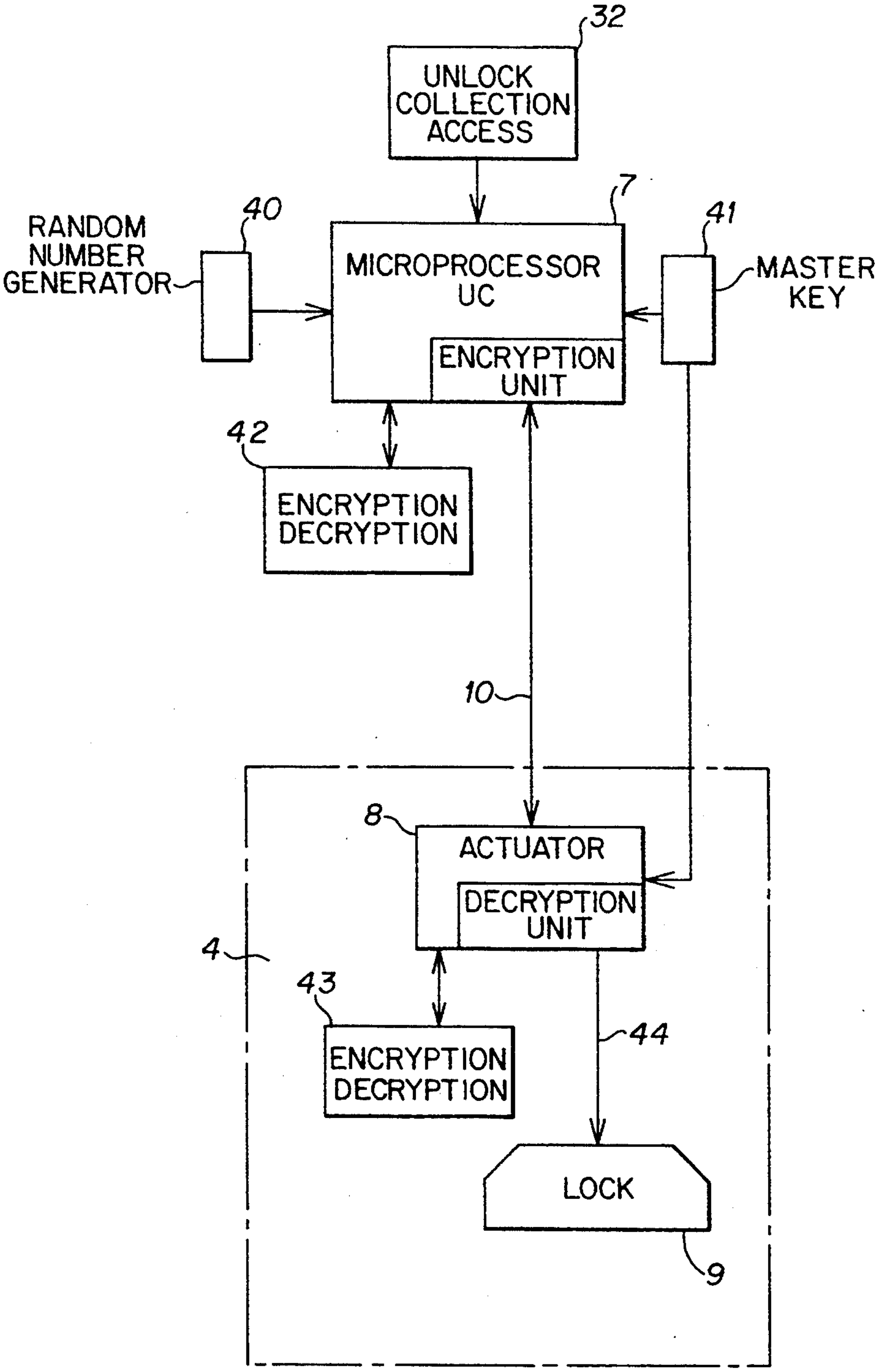
FIG. 3 shows the apparatus for communicating between the central unit and the actuator, in a schematic manner.

FIG. 3 shows in more detail the means which enable the various parts of the invention to communicate and, in particular, between MCR 14, central unit 7, actuator 8 and cash box lock 9.

The central unit 7 is connected, in a symbolic manner for ease of understanding of the invention, to means referenced 40 for generating a random number and a memory 41 containing a master key in the form of a numerical value. These numerical values (random number and master key) are used to encrypt the information which is transferred between central unit 7 and actuator 8 via communication line 10. The encryption means are known per se and can rely on an algorithm of the DES (data encryption standard) type. These algorithms are also known per se and, therefore, are not described below in detail. The encryption/decryption means are shown symbolically by a block 42.

The central unit 7 receives a request to unlock the access door for cash box 4 from the functional block 32 (corresponding to the functional block 32 of FIG. 2), for collection. The actuator 8 is associated with the master key issued by the block 41 and also with encryption/decryption means referenced 43. The actuator 8 is adapted to control the lock 9, via a control line, shown by heavy line referenced 44, in order to open the door of cash box 4.

The central unit 7, on receiving a request from block 32 to open the door of cash box 4, draws a random number from block 40 and encrypts this value by the means 42, using the master key of block 41. This encrypted value derived from the random number is sent over the communication line 10 to the actuator 8. The actuator 8, which has been provided with the master key of block 41, can recover the random number by means of its own decryption means 43.

The random number then becomes the derived key which allows communication between the central unit 7 and the actuator 8 to be encrypted. The encrypting may be effected with the aid of an algorithm of known type, such as that relying on a DES function, as indicated above.

The communication between central unit 7 and actuator 8 is thus effected in encrypted form, in an inviolable manner, since the derived key serving to encrypt the message is a random number and is known only to central unit 7 and actuator 8. It is, thus, not possible to intervene in this layer of the communication by fraudulent maneuvers involving simulation or display or command detection or orders sent to operate the actuator with a view to opening the cash box 4. The connection 44 between the actuator and the lock is referred to as a power connection, since the lock is essentially an electro-mechanical device which requires electric power, in particular high power. The invention allows the actuator part to be isolated inside cash box 4 and, thus, prevents any direct action on the lock by relatively easily copied power means.

Supplementing this, the apparatus of the invention includes means for storing characteristics of the operations carried out, such as the number of operations and the identity of the person involved and also for storing characteristics of valid memory cards but which have been lost and then found by a non-authorized person and have been inserted into the dispenser in fraudulent manner. This makes it possible to identify any fraudulent act at the start of operations.

The above description refers to the security aspect in relation to the cash box (money).

The system of the invention also allows security of access to be ensured to the maintenance compartment, which can contain very large assets in the form of preprinted tickets.

Thus, the actuator and the encrypting system of the invention control the opening of two doors of two compartments—"cash box" and "maintenance".

A person authorized for maintenance who has opened the maintenance door should not get access to the closure system for this door. Otherwise, he could block the actuator fraudulently and, thus, intervene later on in an "undefended" machine. This is why the entire closure assembly for the maintenance compartment and for the cash box compartment is located in the armored zone of the cash box compartment.

The invention is not limited to the described embodiment but encompasses all variants which fall within the scope of the following claims.

I claim:

1. Apparatus for controlling selective access to at least a first compartment and a second compartment defined inside an enclosure of a dispenser for goods and/or services, in such a manner as to prevent access to the second compartment while allowing access to the first compartment, comprising recognition means for recognizing an identifying object of an access-seeking person, the object being inserted from outside the enclosure, said recognition means communicating in an encrypted manner through first communication means with a central unit which is in communication, in an encrypted manner, through second communication means with an actuator, so as to control the actuator which is disposed inside the second compartment and is adapted to allow opening/closing of a lock associated with said second compartment, said central unit including means for generating an encrypted message with the aid of an own key specific to the central unit, said actuator having means adapted to decrypt said message in order to recover said own key, the latter thus becoming the derived key adapted to be used to generate at least one communication message between the actuator and the central unit, and vice versa.

2. Apparatus according to claim 1, wherein said own key is formed by a random number generated by the central unit.

3. Apparatus according to claim 1, wherein said object inserted by the access-seeking person is a memory card, and the recognition means include a memory card reader.

4. Apparatus according to claim 1, wherein the first communication means include an algorithm of DES type.

5. Apparatus according to claim 1, wherein the recognition means check a code pertaining to the access-seeking person who is the holder of the memory card.

6. Apparatus according to claim 1, further including a memory adapted to record the set of operations carried out and the identity of the access-seeking persons.

* * * * *